United States Patent
Scaer et al.

[19]

[11] Patent Number: 6,101,498
[45] Date of Patent: *Aug. 8, 2000

[54] SYSTEM FOR DISPLAYING A COMPUTER MANAGED NETWORK LAYOUT WITH A FIRST TRANSIENT DISPLAY OF A USER SELECTED PRIMARY ATTRIBUTE OF AN OBJECT AND A SUPPLEMENTARY TRANSIENT DISPLAY OF SECONDARY ATTRIBUTES

[75] Inventors: Bethany Rose Scaer, Nashua, N.H.; Jeffrey Phillip Snover, Austin, Tex.; Brian James Tarbox, Littleton, Mass.

[73] Assignee: International Business Machines Corp., Armonk, N.Y.

[*] Notice: This patent is subject to a terminal disclaimer.

[21] Appl. No.: 08/972,052

[22] Filed: Nov. 17, 1997

[51] Int. Cl.$^7$ .................................................. G06F 17/30
[52] U.S. Cl. ........................... 707/10; 709/223; 345/334; 345/339; 345/347; 345/356; 345/969
[58] Field of Search .............................. 395/200; 707/10; 709/223; 345/356, 334, 339, 347, 969

[56] References Cited

U.S. PATENT DOCUMENTS

| | | | |
|---|---|---|---|
| 5,295,244 | 3/1994 | Dev et al. | 395/161 |
| 5,353,399 | 10/1994 | Kuwamoto et al. | 395/159 |
| 5,471,399 | 11/1995 | Tanaka et al. | 364/491 |
| 5,483,631 | 1/1996 | Nagai et al. | 395/155 |
| 5,673,401 | 9/1997 | Volk et al. | |
| 5,684,988 | 11/1997 | Pitchaikani et al. | 707/104 |
| 5,734,372 | 3/1998 | Verstockt | 345/163 |
| 5,742,768 | 4/1998 | Gennaro et al. | 395/200.33 |
| 5,751,965 | 5/1998 | Mayo et al. | 395/200.54 |
| 5,764,913 | 6/1998 | Jancke et al. | 395/200.54 |
| 5,809,512 | 9/1998 | Kato | 707/502 |
| 5,966,126 | 10/1999 | Szabo | 345/348 |

*Primary Examiner*—Hosain T. Alam
*Assistant Examiner*—Jean M. Corrielus
*Attorney, Agent, or Firm*—Jerry B. Kraft; Jeffrey S. LaBaw

[57] ABSTRACT

A computer managed communication network with user interactive access via a plurality of display terminals and including a plurality of network objects, each respectfully associated with one of a plurality of linked network nodes. The network includes means such as databases for storing data representing attributes of network objects. There is graphically displayed on at least one of said display terminals, at least a portion of said linked network nodes and associated objects. In addition, there is a user interactive implementation for activating for each of a plurality of objects, a primary transient display of a selected primary attribute of said object adjacent to the object and a second transient display of supplementary attributes of said object, remote from said selected object and active during the transience of the primary transient display. The invention operates effectively in a display setup in which objects are graphically displayed as icons without alphanumeric labels and the primary transient display serves to label selected object.

12 Claims, 7 Drawing Sheets

SYSTEM FOR DISPLAYING A COMPUTER MANAGED NETWORK LAYOUT WITH A FIRST TRANSIENT DISPLAY OF A USER SELECTED PRIMARY ATTRIBUTE OF AN OBJECT AND A SUPPLEMENTARY TRANSIENT DISPLAY OF SECONDARY ATTRIBUTES

CROSS-REFERENCE TO RELATED COPENDING PATENT APPLICATIONS

The following two patent applications which have the same inventorship as the present invention and are assigned to a common assignee cover subject matter related to the subject matter of the present invention: A SYSTEM FOR DISPLAYING A COMPUTER MANAGED NETWORK LAYOUT WITH TRANSIENT DISPLAY OF USER SELECTED ATTRIBUTES OF DISPLAYED NETWORK OBJECTS, R. R. Scaer et. al., Ser. No. 08/971,255 and A SYSTEM FOR DISPLAYING A COMPUTER MANAGED NETWORK LAYOUT WITH VARYING TRANSIENCE DISPLAY OF USER SELECTED ATTRIBUTES OF A PLURALITY OF DISPLAYED NETWORK OBJECTS, R. R. Scaer et. al., Ser. No. 08/971,252, both filed on Nov. 17, 1997.

TECHNICAL FIELD

The present invention relates to computer managed communication networks and particularly to computer controlled user interactive display terminals for graphically displaying portions of such networks including linked nodes and associated network objects.

BACKGROUND OF THE INVENTION

The 1990's decade has been marked by a societal technological revolution driven by the convergence of the data processing industry, the communications industry and the consumer electronics industry. This advance has been even further accelerated by the extensive consumer and business involvement in the internet over the past two years. It seems as if virtually all aspects of human endeavor in the industrialized world will potentially involve human-computer interfaces, and especially such interfaces to communication networks such as the internet. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers, workers and business people to be involved in computer interfaces. In addition because of the vast amount of information potentially available through networks such as the internet, there has been an increasing demand on the part of relatively sophisticated users for implementations which make display terminal access to the internet less cluttered and confusing and of course easier to use.

The present invention is directed to the problems of providing less cluttered and easier graphical display access to communication network nodes, objects associated with such nodes as well as the attributes of such objects. In order to solve such problems, the above mentioned SYSTEM FOR DISPLAYING A COMPUTER MANAGED NETWORK LAYOUT WITH TRANSIENT DISPLAY OF USER SELECTED ATTRIBUTES OF DISPLAYED NETWORK OBJECTS, R. R. Scaer et. al., application makes use of transient displays in which user selected attributes of such nodes and objects may be displayed. The present invention relates to situations where the above mentioned graphical displays of network layouts is so comprehensive that the alphanumeric descriptive information which is customarily on display screens to explain, label and annotate the icons must be absent or kept to a minimum in order that the user interface remain easy to interpret. To this end, the present invention uses transient displays to provide the user with the primary and supplemental data that he may require with respect to network objects in an orderly arrangement of plural transient displays which does not clutter or interfere with the ease of use of the graphical interface.

SUMMARY OF THE INVENTION

The present invention relates to a computer managed communication network with user interactive access via a plurality of display terminals and including a plurality of network objects, each respectfully associated with one of a plurality of linked network nodes. The network includes means such as databases for storing data representing attributes of network objects. Means are provided for graphically displaying on at least one of said display terminals, at least a portion of said linked network nodes and associated objects. In addition, there is provided user interactive means for activating for a selected object, a first transient display of a selected primary attribute of a selected one of said displayed objects proximate to said object and a second transient display of supplementary attributes of said object; the second transient display is remote from said selected object and is active during the transience of said first display. In this manner, the most active areas of the display i.e., the areas where the interconnected objects and nodes making up the network are displayed are not cluttered with lists of data related to the selected object but still the user may readily access these as needed from the remote areas where the secondary display is located which is preferably at marginal areas of the screen.

In a preferred embodiment, the objects are graphically displayed as icons without alphanumeric labels and said first transient display serves to label selected object and the second transient display comprises a table of selected attributes of said selected object. The object is preferably selected by hovering a cursor proximate to the selected object for a predetermined time period.

DETAILED DESCRIPTION OF THE PREFERRED EMBODIMENT

Before going into the details of specific embodiments, it will be helpful to understand from a more general perspective the various elements and method which may be used to implement the present invention. Since the present invention is directed to transient display expedients to improve the user-friendliness of graphical display interfaces to network object attributes, we will not go into great detail in describing the networks to which the present invention is applicable. U.S. Pat. Nos. 5,295,244, Dev et al. and 5,353,399, Kuwamoto et al. adequately detail conventional networks to which the present invention would be applicable including appropriate network management and display terminal access to such networks. Reference has also been made to the applicability of the present invention to a global network such as the internet. For details on internet nodes, objects and links, reference is made to the text, *Mastering the Internet,* G. H. Cady et al., published by Sybex Inc., Alameda, Calif., 1996.

Any data communication system which interconnects or links computer controlled systems or network objects at various sites or network nodes defines a communications network. A network may be as simple as two linked computers or it may be any combination of LANS (Local Area Networks) or WANS (Wide Area Networks). Of course, the internet is a global network of a heterogeneous mix of computer technologies and operating systems. At each level in a network hierarchy, the unit may considered as a network object. For example, since the internet connects networks of computers, a particular corporate network could be an internet object. Then, the particular LAN of each department in the corporate network would be an object. At high levels, regional networks representative of cities could be objects. Likewise, computer controlled objects could be linked together by function to form networks which in turn could be linked into the internet backbone as network objects characterized by functions as accounts receivable/payable or video-on-demand distribution. Higher level objects are linked to the lower level objects in the hierarchy through a variety of network server computers. For example a video-on-demand distribution network could comprise several video server repository sites each having its unique collection of stored films; each of the sites would be network objects and the video distribution network itself would be an object on the internet. Of course at each level in the hierarchy, each object is associated with its own node.

In the subsequent, more specific descriptions of the preferred embodiment, the attributes and the storage of attributes will be discussed. It will be understood that the data representing particular object attributes or the data from which such particular attributes may be calculated dynamically may be stored in association with the object itself, a computer server managing the object or in a broad database associated with the overall network management.

In addition, for convenience in description of the operation of the various transient display implementations of the present invention, some simple object attributes may be used. It will be understood, that the implementations should be equally applicable in the reading of more complex attributes.

Figure 1:
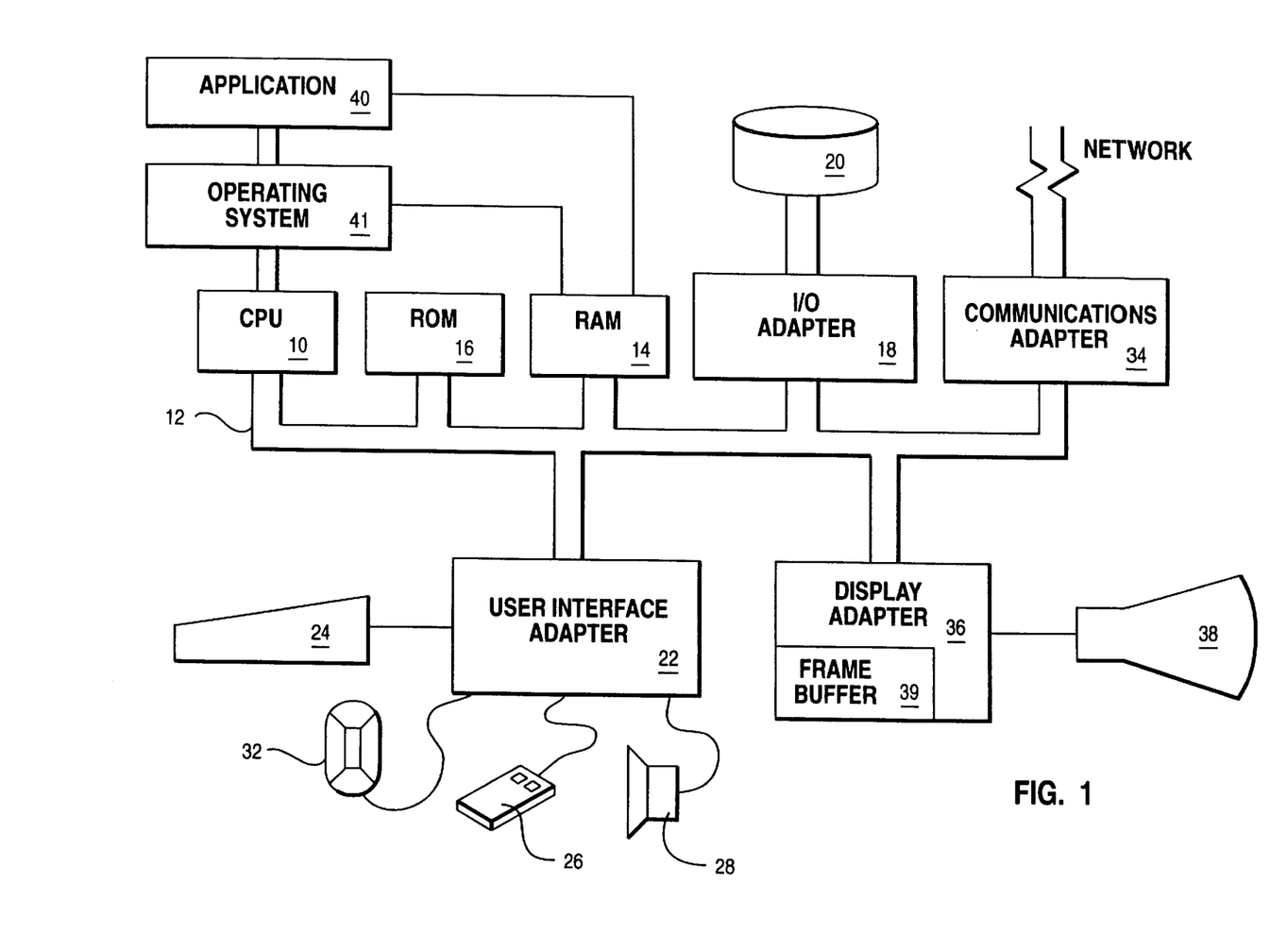
FIG. 1 is a block diagram of a data processing system including a central processing unit which is capable of implementing the transient display of the present invention.

Referring to FIG. 1, a typical data processing system is shown which may function as the computer controlled display terminal used in implementing the transient display functions in the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A programming system application 40 to be subsequently described in detail runs in conjunction with operating system 41 and provides output calls to the operating system 41 which implement the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes of course the internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the transient displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment which will be subsequently described, the mouse will be the input means through which the used will interface with the system. the display terminal of FIG. 1 communicates with the network such as the internet through communications adapter 34.

Figure 2:
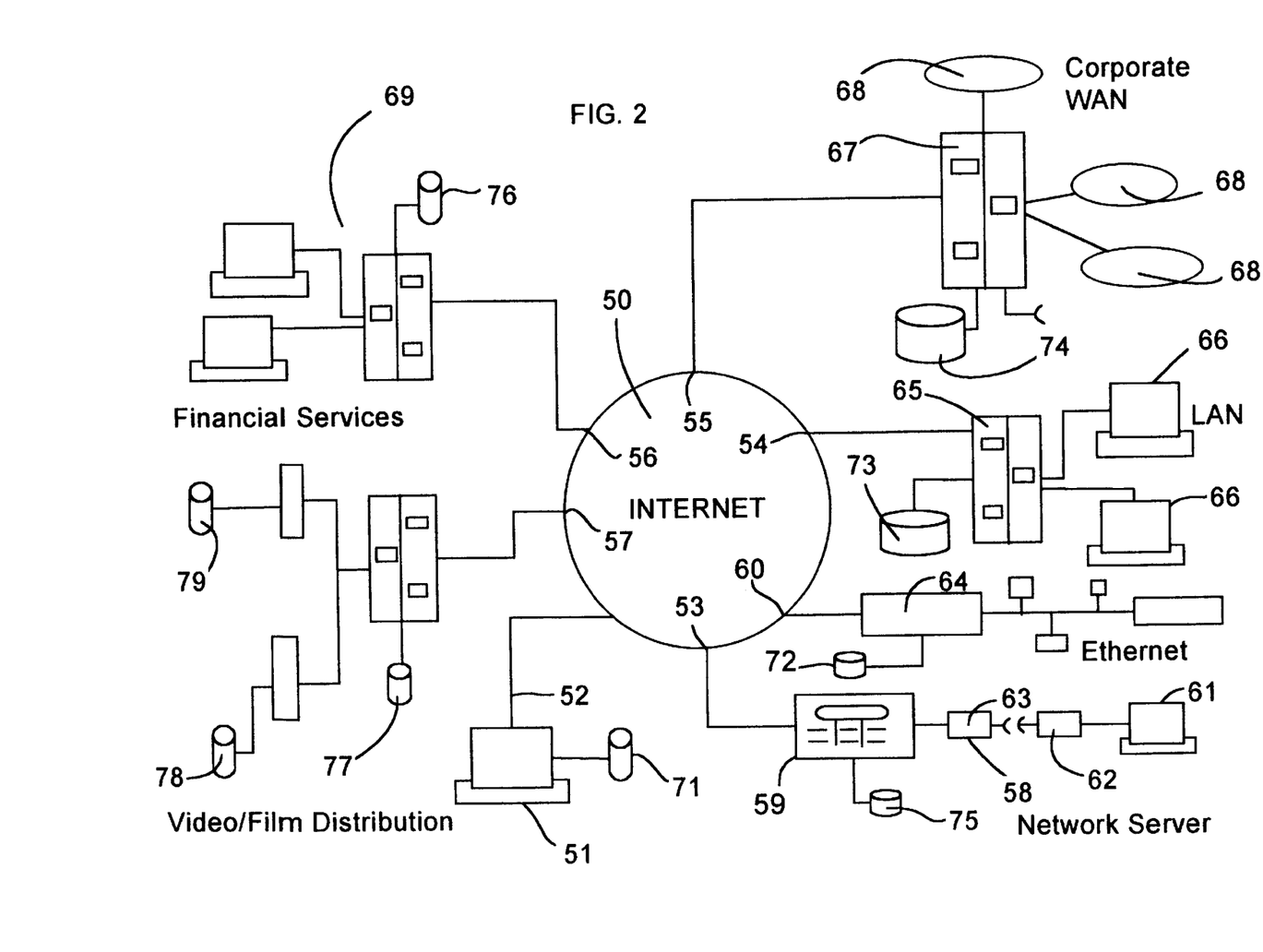
FIG. 2 is a generalized diagrammatic view of an internet portion upon which the present invention may implemented.

A generalized diagram of a portion of an internet to which the computer controlled display terminal 51 used for the transient display of the present invention is shown in FIG. 2. Terminal 51 is the computer system shown in FIG. 1 and connection 52 (FIG. 2) is the network connection shown in FIG. 1. Some typical major objects connected to the net are user network 58 connected through server 59 at node 53. In such a server network, the individual users' workstations 61 are connected through telephone modems 62 and 63 to the server 59. Of course at the next level, each of the user workstations 61 may be considered as network objects. Among the other illustrative network objects are ethernet 64 at node 60 and a LAN at node 54 consisting of server 65 and workstations 66. At node 55, the connected object is a corporate WAN consisting of network server 67 and sub-networks 68. In addition, functional networks such as financial services network 69 and video/film distribution network 70 may be considered as objects, respectively connected at nodes 56 and 57. It should be noted that a variety of databases, 71 through 79 are shown respectively associated with network objects at various levels. These databases represent the various locations and repositories at which attributes and attribute values which may be transiently displayed in accordance with the present invention are stored. Thus, when the obtaining or fetching of attributes values are subsequently described, it should be understood that they may be obtained from such databases or combination of databases throughout the network using any conventional network expedient for obtaining data.

Figure 4:
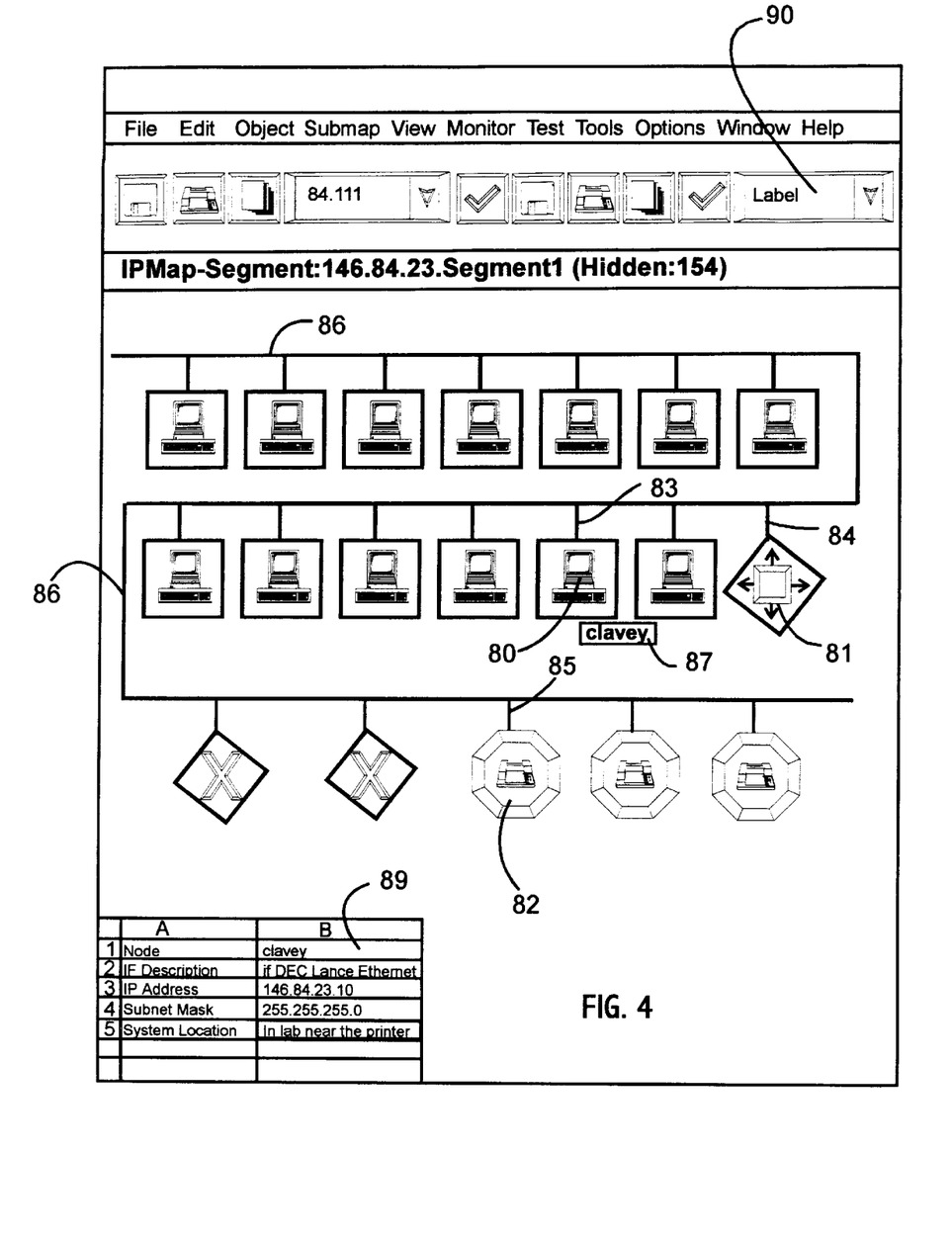
FIG. 4 is the display screen view of FIG. 3 with the values of primary and secondary selected attributes of a first designated object transiently displayed.
Figure 5:
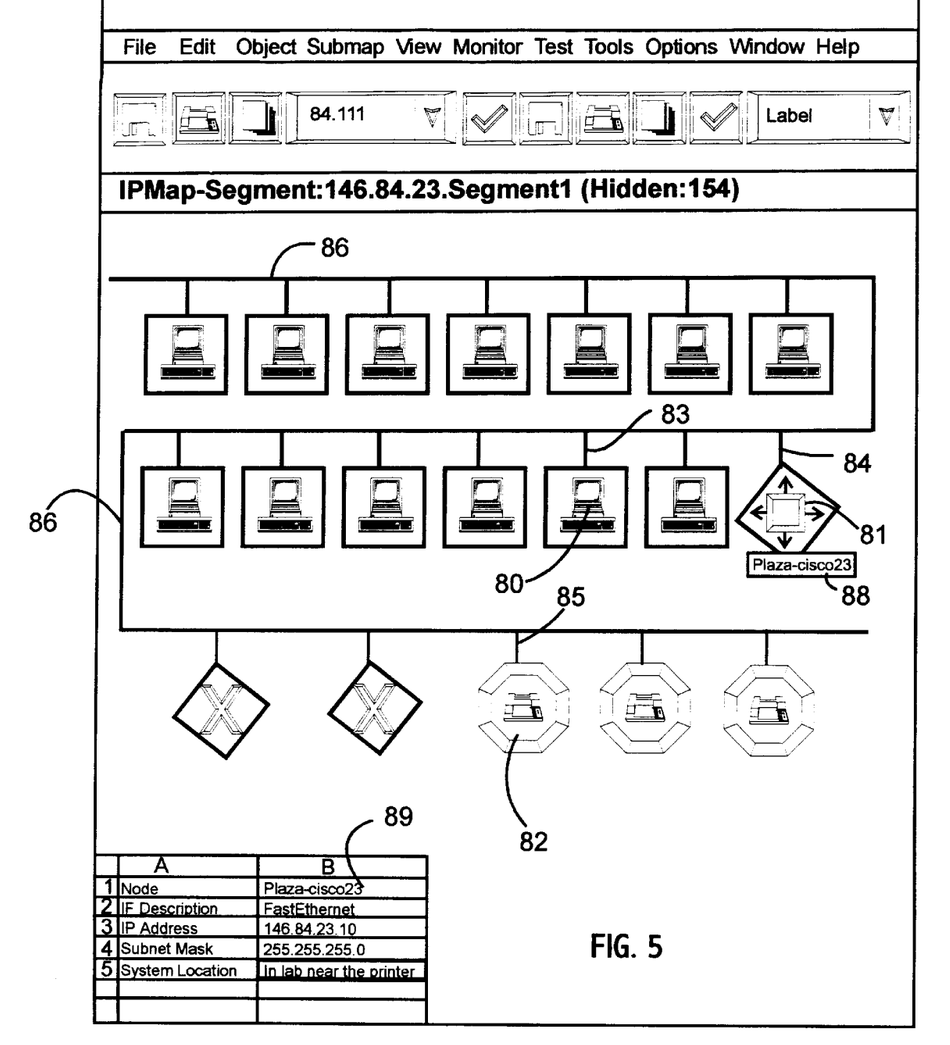
FIG. 5 is the display screen of FIG. 4 after a second object has been selected and the primary and secondary attributes of the second object are now transiently displayed.

There will now be described a simple illustration of the present invention with respect to the display screens of FIGS. 3 through 5. When the screen images are described, it will be understood that these may be rendered by storing an icon creation program such as those in Windows 95 or OS-2 operating systems in the RAM 14 of the system of FIG. 1. The operating system is diagrammatically shown in FIG. 1 as operating system 41.

An embodiment of the present invention will be described commencing with the display screen shown in FIG. 3. This initial display screen is presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 3:
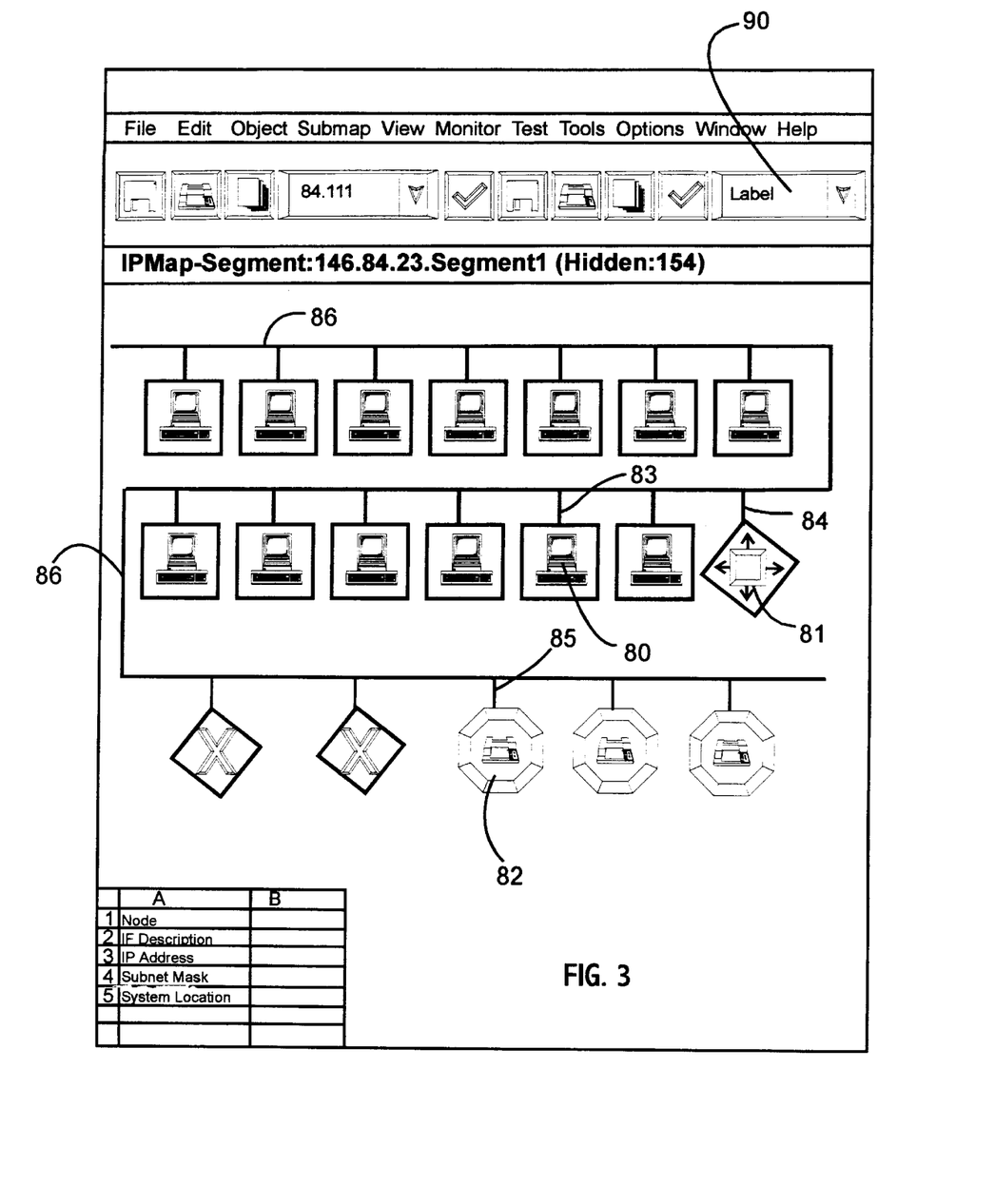
FIG. 3 is a diagrammatic view of a display screen on which a network portion is graphically represented.

The initial display screen of FIG. 3 shows a graphic representation of a portion of a network in which network objects are represented as icons such as objects 80, 81, and 82 respectively connected at node representations 83, 84 and 85 to network bus representation 86. As will be noted, the portion of the display in which the objects are displayed is uncluttered by any alphanumerics; the objects are not even labelled. We will now proceed to select a primary attribute to be displayed adjacent to a selected object. An attribute is selected by clicking on attribute window 90 by a user interactive I/O device such as mouse 26, FIG. 1. This scrolls through a menu of attributes from which the user selects the attribute which in the present case is "label". Thus, the selected primary attribute is the name or designation of the object. In a situation as the present one where there are no initial alphanumerics, the primary attribute selected will usually be the label or object identifier. On the other hand, in displays where the objects are already identified on the initial display, the primary attribute may be any thing which the user needs as the most important or basic parameter. Now, the user must select one of the objects so that the programming process may fetch an attribute value for that object. With reference to the same display screen shown in FIG. 4, the user has made a selection of object 80 by moving his cursor in a gesture not shown under control of mouse 26, FIG. 1 to the object 80. In the present control system, this selection gesture merely involved hovering (maintaining the cursor without clicking the mouse in the vicinity of object icon 80 for a brief time period set by the program). As a result, the primary attribute value which in the present case is the name of the node, "clavey" appears in the primary transient display 87. At the same time, there is activated a secondary transient display 89 in a region of the display screen which is remote from the region where the network nodes 80, 81, etc. are graphically displayed. This secondary transient display has a table of several supplementary attribute values for selected object 80, such as interface description, address and location. As will be hereinafter described with respect to the flowcharts of FIGS. 6 and 7, this value may obtained from any appropriate database 71–79 in FIG. 2 or it may be dynamically calculated from data in one or more of these databases. In addition, the attribute values may be retrieved via a network information protocol such as SNMP (Simple Network Management Protocol), DMI (Desktop Management Interface) or WEBM (Web Management).

It should be noted that the primary attribute which appears in primary transient display 87 may be readily changed by any conventional attribute selection steps such those described above with respect to attribute window 90. For example if in a step not shown, the attribute menu were scrolled until "IF Description" appeared in window 90, then "if DEC Lance Ethernet" would end up in primary transient display 87 and the "label" attribute would become a secondary attribute on supplementary transient display 89. Now with reference to FIG. 5, a subsequent object has been selected, object 81 and a primary transient display 88 has been set up for it which contains the value of the primary transient display, i.e., "label". Secondary transient display 89 remains at its same remote location but it now contains a listing of the secondary attributes of object 81.

Figure 6:
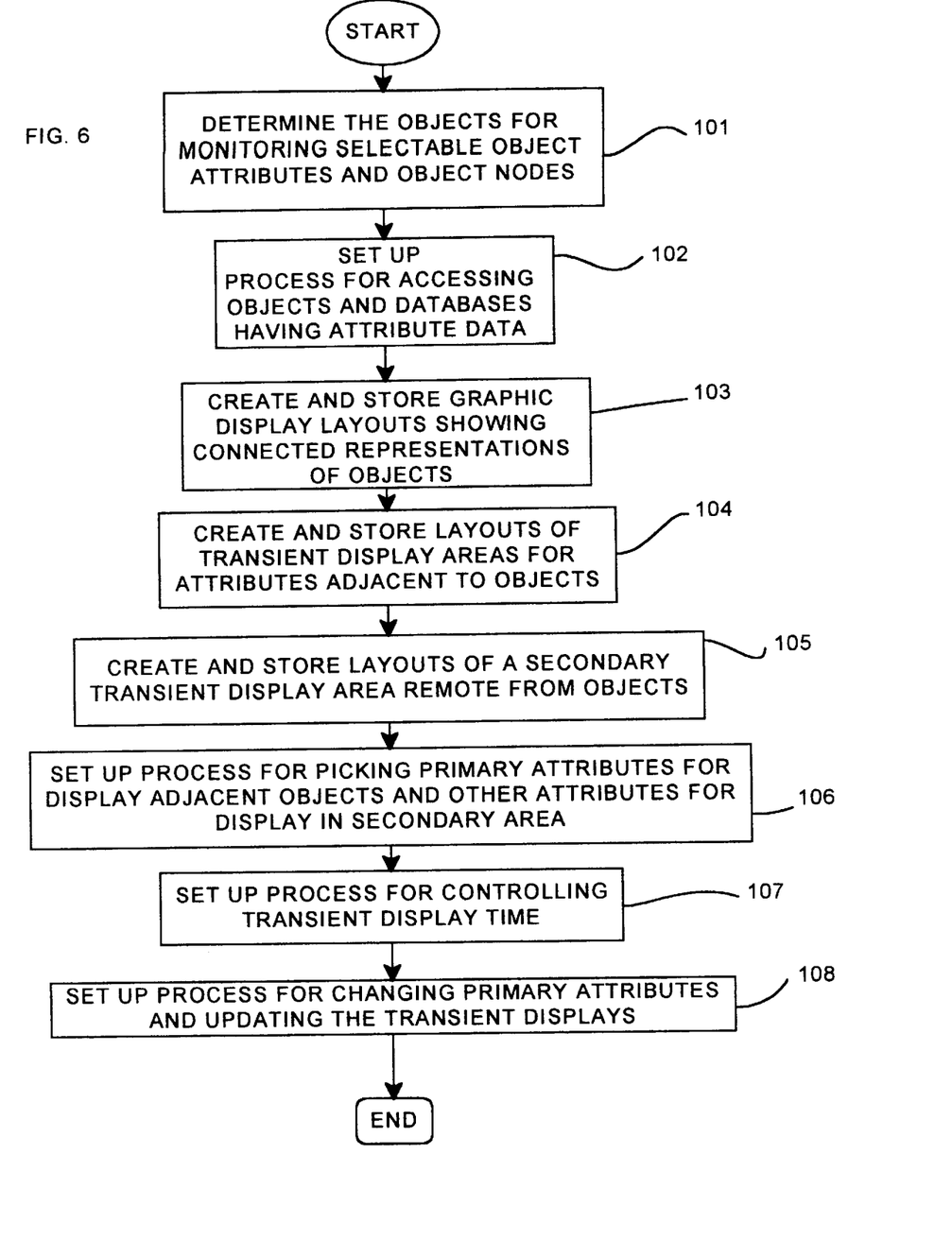
FIG. 6 is a flowchart showing the development of a transient display process of the present invention.
Figure 7:
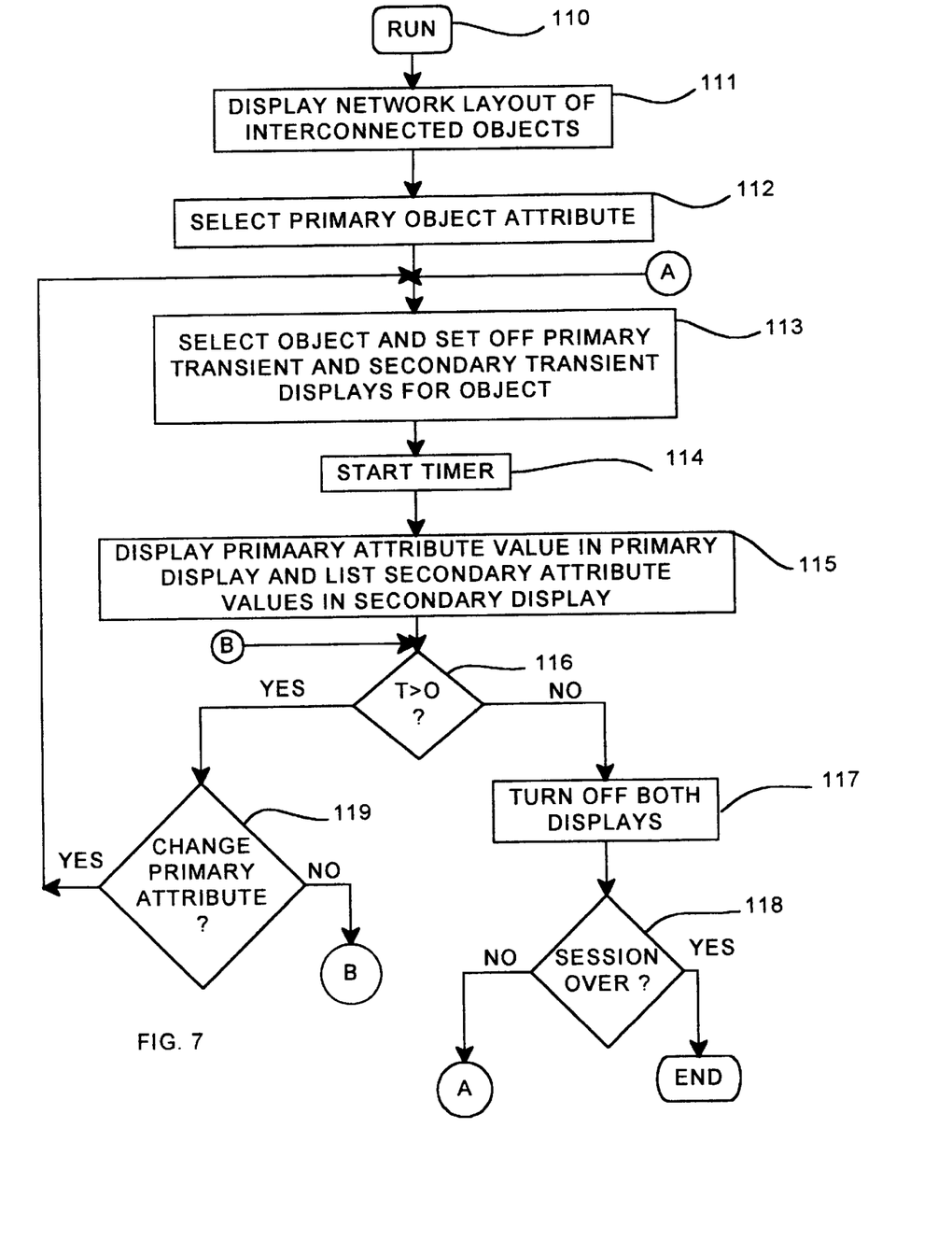
FIG. 7 is a flowchart showing the running of the transient display process described with respect to FIG. 6.

Now with reference to FIGS. 6 and 7, we will describe a process implemented by the present invention in conjunction with the flowcharts of these figures. FIG. 6 is a flowchart showing the development of a transient display process of the present invention. FIG. 7 is a flowchart showing the running of the transient display process described with respect to FIG. 6.

With reference to FIG. 6, first, process step 101, in developing the program, a determination should be made as to which objects are to be monitored for attributes. It could range from a major internet portion objects, FIG. 2, to a local network having a handful of objects. Next, step 102, a program process for accessing the attribute data for the objects is created and stored. For simplicity in illustration, the attribute data could be considered as stored in the databases 71 through 79, FIG. 2, associated with the various objects. Accessing of the databases and the fetching of attribute data could involve any conventional network routines for data acquisition. The display screen layouts of icons representative of objects together with appropriate interconnections as in the illustrative layouts of FIGS. 3–6 using conventional user interfaces provided by operating systems such as "Windows 95", (a ™ of Microsoft Corp.) or "X-Windows", step 103 are created and stored. Then, step 104, using the same layout design program, layouts for the primary transient displays such as displays 87 and 88 in FIGS. 4–5 are developed. Then, step 105, using the same layout design program, the layouts of secondary transient display 89 is developed. Then, step 106, a process is set up by which the user may select the attributes to be respectively displayed in the primary and secondary display regions. There is also provided, step 107, a processing setup for timing the periods of transience by conventional timing expedients. Lastly, a process is provided for the changing of primary attributes such as that previously described with respect to FIG. 4 which results in a change in the primary transient display and corresponding updating changes in the secondary display, step 108. This ends the program setup.

The running of the process will now be described with respect to FIG. 7. In following some typical routines, the step in FIG. 7 will given together with a reference to the display screen of FIGS. 3–5 which best illustrates the step. The program is run, step 110, and a network layout is displayed, step 111, as in FIG. 3. Next, step 112, a primary object attribute is selected as "label" in the FIGS. 3 and 4 displays. Then, step 113, an object is selected, object 80, FIG. 4 layout which sets off a primary transient display of the selected attribute for the selected object, i.e., transient display 87 as well as a secondary display 89 of several supplemental attributes of object 80. Then, step 114, an appropriate timer is set for the preselected period of transience, "t". At the same time, as shown in FIG. 4, the primary attribute value of selected object 80 is displayed in the primary transient display 87 while the supplemental attribute values are displayed in secondary transient display 89, FIG. 7, step 115. During the time that both transient displays are maintained, the time is tracked, decision step 116. If there is time left, t>0, the transient displays are maintained, and the flow goes to decision step 119 where a determination is made as to whether the user has changed the attribute before the previous attribute transient display has timed out. If "Yes", then the process proceeds back to step 113 where the transient display for primary attribute for the present or changed object if that be the case is updated and the secondary transient display is accordingly also updated and the process then proceeds.

Returning now to decision step 116, if there is no time left on the transient display, then both transient displays are turned off, step 117, FIG. 7 and the procedure moves to decision step 118 where a determination is made as to whether the session is over. If Yes, then it is ended. If No, then the session is returned to step 113 via branch "A" and the above procedure is repeated. Then if in the course of this procedure, step 119 is reached again and if the user does not change the attribute, i.e., the decision from step 119 is No, then the process proceeds via branch "B" to decision step 116 and the displays continue until t times out.

Although certain preferred embodiments have been shown and described, it will be understood that many changes and modifications may be made therein without departing from the scope and intent of the appended claims.

What is claimed is:

1. In a computer managed communication network with user interactive access via a plurality of display terminals and including a plurality of network objects, each respectively associated with one of a plurality of linked network nodes,
    means for storing data representing attributes of said network objects,
    means for graphically displaying on at least one of said display terminals, at least a portion of said linked network nodes and associated objects,
    user interactive means for selecting a primary attribute from a Plurality of attributes of a selected one of said displayed objects, and
    user interactive means for activating a first transient display of said primary attribute proximate to said object and a second transient display of supplementary attributes of said object,
    said second transient display being remote from said selected object and active during the transience of said first display.

2. The computer managed communication network of claim 1 wherein said objects are graphically displayed as icons without alphanumeric labels and said first transient display serves to label selected object.

3. The computer managed communication network of claim 2 wherein said first transient display is of the identifier attribute of said selected object and said second transient display comprises a table of selected attributes of said selected object.

4. The computer managed communication network of claim 3, wherein said means for activating said transient displays comprise means for hovering a cursor proximate to a selected object for a predetermined time period.

5. A method for determining the status of a plurality of attributes of a plurality of network objects each respectively associated with one of a plurality of linked network nodes in a computer managed communication network with user interactive access via a plurality of display terminals comprising:
    storing data representing attributes of said network objects,
    graphically displaying on at least one of said display terminals, at least a portion of said linked network nodes and associated objects,
    responsive to user interaction, selecting a primary attribute from a plurality of attributes of a selected one of said displayed objects, and
    responsive to user interaction, activating a first transient display of said selected primary attribute proximate to said object and a second transient display of supplementary attributes of said object,
    said second transient display being remote from said selected object and active during the transience of said first display.

6. A method according to claim 5 wherein said objects are graphically displayed as icons without alphanumeric labels and said first transient display serves to label selected object.

7. A method according to claim 5 wherein said first transient display is of the identifier attribute of said selected object and said second transient display comprises a table of selected attributes of said selected object.

8. A method according to claim 7, wherein said transient displays are activated by hovering a cursor proximate to a selected object for a predetermined time period.

9. A computer program for a computer managed communication network with user interactive access via a plurality of display terminals and including a plurality of network objects, each respectively associated with one of a plurality of linked network nodes, said program having data structures included on a computer readable medium comprising:
    means for storing data representing attributes of said network objects,
    means for graphically displaying on at least one of said display terminals, at least a portion of said linked network nodes and associated objects,
    user interactive means for selecting a primary attribute from a plurality of attributes of a selected one of said displayed objects, and
    user interactive means for activating a first transient display of said primary attribute proximate to said object and a second transient display of supplementary attributes of said object,
    said second transient display being remote from said selected object and active during the transience of said first display.

10. The computer program according to claim 9 wherein said objects are graphically displayed as icons without alphanumeric labels and said first transient display serves to label selected object.

11. The computer program according to claim 10 wherein said first transient display is of the identifier attribute of said selected object and said second transient display comprises a table of selected attributes of said selected object.

12. The computer program according to claim 11 wherein said means for activating said transient displays comprise means for hovering a cursor proximate to a selected object for a predetermined time period.

* * * * *